(12) United States Patent
Lanter et al.

(10) Patent No.: US 6,171,632 B1
(45) Date of Patent: Jan. 9, 2001

(54) ANIMAL FEED GEL

(75) Inventors: Kent J. Lanter, Waterloo, IL (US); Clara Roselina Angel Gonzalez, Laurel, MD (US)

(73) Assignee: Purina Mills, Inc., St. Louis, MO (US)

( * ) Notice: Under 35 U.S.C. 154(b), the term of this patent shall be extended for 0 days.

(21) Appl. No.: 09/262,905

(22) Filed: Mar. 5, 1999

Related U.S. Application Data

(60) Provisional application No. 60/077,232, filed on Mar. 9, 1998.

(51) Int. Cl.[7] .......... A23L 1/053; A23L 1/0532; A23L 1/0562
(52) U.S. Cl. .......... 426/573; 426/576; 426/578; 426/601; 426/635; 426/656; 426/805
(58) Field of Search .................. 426/573, 576, 426/578, 656, 601, 635, 805

(56) References Cited

U.S. PATENT DOCUMENTS

| | | | | |
|---|---|---|---|---|
| 4,267,197 | * | 5/1981 | Sawhill | 426/69 |
| 4,804,546 | * | 2/1989 | Sawhill | 426/69 |
| 5,217,740 | | 6/1993 | Lanter | 426/573 |
| 5,525,353 | * | 6/1996 | Fajt | 424/442 |

FOREIGN PATENT DOCUMENTS

| | | | |
|---|---|---|---|
| 2133502 | 10/1994 | (CA) | A23K/1/04 |
| 297 22 296 | 12/1997 | (DE) | A23K/1/18 |
| 1 549 196 | 7/1979 | (GB) | A23B/4/12 |
| 2 149 639 | 11/1984 | (GB) | A23K/1/10 |
| 87750 | 6/1990 | (LU) | . |
| 95/28830 | 11/1995 | (WO) | A10K/61/02 |
| 98/47392 | 10/1998 | (WO) | A23L/1/0532 |
| 99/12430 | 3/1999 | (WO) | A23K/1/00 |

* cited by examiner

*Primary Examiner*—Chhaya D. Sayala
(74) *Attorney, Agent, or Firm*—Whyte Hirschboeck Dudek SC

(57) ABSTRACT

Nutritionally balanced, firm, flexible gels are prepared in shapes attractive to animals, e.g. in the shape of fish for fish-eating animals, the gels comprising:

A. At least one gelling agent, e.g. a gelatin and/or a gum;
B. At least one animal protein; and
C. Water.

The gel optionally comprises other nutritionally valuable ingredients such as various oils and fats, plant protein, vitamins, minerals, antioxidants and the like. In one embodiment, the gel is prepared by first blending the appropriate ingredients into a homogenous mass, casting the mass into a block, and then cutting the block into the desired shapes using a patterned cutter.

16 Claims, 2 Drawing Sheets

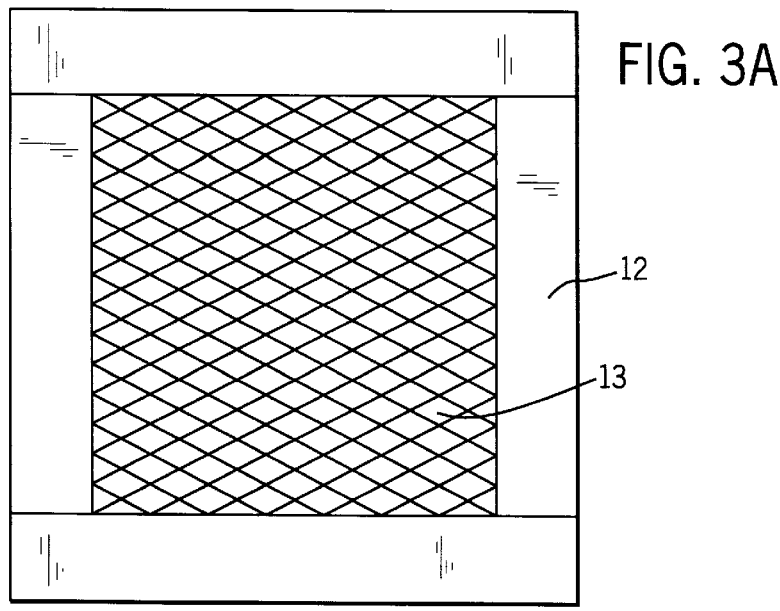
FIG. 3A
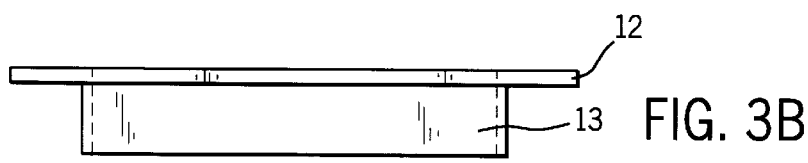
FIG. 3B
FIG. 4A
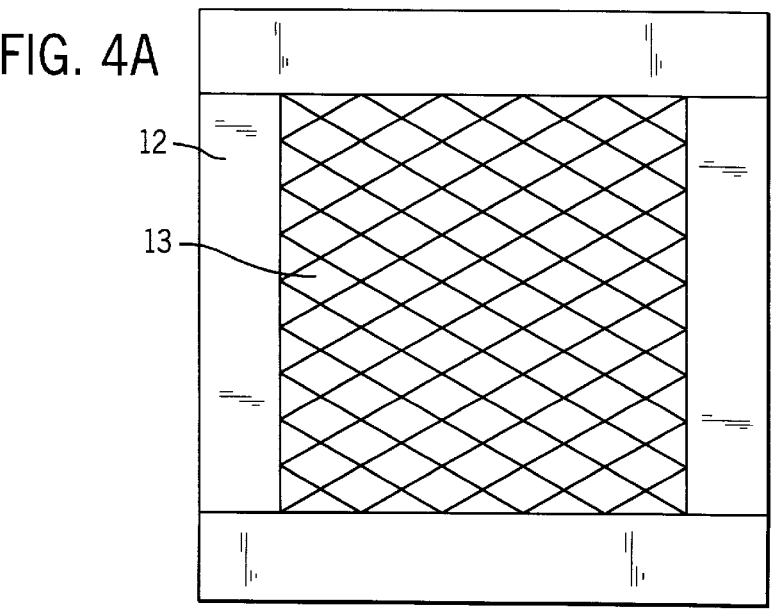
FIG. 4B
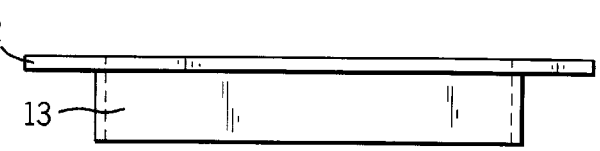

ANIMAL FEED GEL

This application claims the benefit of U.S. Provisional Application No. 60/077,232 filed Mar. 9, 1998.

BACKGROUND OF THE INVENTION

1. Field of the Invention

This invention relates to a nonhuman animal feed. In one aspect, the invention relates to a gel food product for animals while in another aspect, the invention relates to a shaped, stiff gel food product for carnivorous animals. In yet another aspect, the invention relates to an animal feed gel cut or molded into the approximate size and shape of a fish for fish-eating animals. In still another aspect, this invention relates to a method of making a shaped, animal feed gel.

2. Description of the Art

The many and varied zoological gardens of the world are responsible for the breeding and care of a wide assortment of animals. The feeding of these animals, particularly carnivorous animals, is a major expense in the operation of these gardens, and it can often prove to be a logistical challenge. Depending upon the type, size and number of animals, insuring that each receives a properly balanced diet in a timely and efficient manner requires careful planning, reliable food sources, trained personnel and, not infrequently, good fortune.

In an effort to diminish the problems associated with the feeding of carnivorous animals, the operators of these gardens and similar establishments, e.g. breeding farms, entertainment facilities, etc., search continuously for manufactured sources of animal protein to replace natural sources of animal protein, e.g. meat, poultry, fish, and the like, fresh or frozen. Manufactured sources of animal protein are generally less expensive, available in bulk quantities, generally easier to transport and store, and often easier to tailor with respect to nutritional content than natural sources of animal protein. Moreover, the sources of some natural animal protein, e.g. fish from the oceans, continue to dwindle which in turn restricts the availability of this protein and raises its price.

One reoccurring problem with manufactured animal protein products is the presentation of the product to the animal in a manner that is similar to the animal's natural food. While many animals, carnivorous and noncarnivorous alike, will consume fungible food items such as grain, various liquids, pelletized or otherwise processed food stuffs, most carnivores require at least some portion of their diet in the general shape and texture of their natural prey, e.g. the carcass or part of a carcass of a fish, bird, mammal, etc. With respect to fish-eating animals, the size, shape and texture of the fish is important to its acceptance as a food.

SUMMARY OF THE INVENTION

Nutritionally balanced feed gels are prepared for animals, the gels comprising in weight percent based upon the weight of the gel:

A. Between about 1 and about 12% of at least one gelling agent;
B. Between about 6 and about 30% of at least one animal protein; and
C. Water.

Preferably, the gel is shaped in the form of a natural food of the animal for which it is intended and, optionally, it comprises other nutritionally valuable ingredients such as various oils and fats, plant protein, vitamins, minerals, antioxidants and the like. The gelling agent comprises one or more gelatins and/or one or more gums. The amount of water in the gel is dependent upon the amount of other ingredients present in the gel, but it is usually present in sufficient quantity to mimic a natural food, e.g. a fish.

In one embodiment of this invention (a low fat formulation), the animal feed gel is in the shape of an elongated diamond (which approximates the general shape of a fish), and it comprises in weight percent based upon the weight of the gel:

A. Between about 0.2 and about 12% of at least one gelling agent;
B. Between about 8 and about 12% fish meal;
C. Between about 6 and about 8% poultry meal;
D. Between about 1 and about 1.5% fish oil; and
E. Water.

In another embodiment of this invention (a high fat formulation), the animal feed gel is also in the shape of an elongated diamond, and it comprises in weight percent based upon the weight of the gel:

A. Between about 0.2 and about 12% of at least one gelling agent;
B. Between about 6.7 and about 10.1% fish meal;
C. Between about 4.4 and about 5.8% poultry meal;
D. Between about 4 and about 8% fish oil; and
E. Water.

The shaped animal feed gel is shaped and sized to the target animal. For example, for penguin chicks the "fish" is sized as a capelin of about 30 grams in weight while for adult seals, walruses and polar bears, the fish is sized to approximate a medium mackerel of about 100 grams in weight. For seed-eating animals, e.g. parrots, the gel is shaped and sized to mimic seeds while for other animals, e.g. big cats, the feed gel can be in the simple form of a large block of several pounds.

In another embodiment of this invention, the animal feed gel is prepared by first blending the appropriate ingredients into a homogenous mass, pouring the mass into a large block and allowing it to set, and then cutting the block (or a slab cut from the block) into the desired shapes using a patterned cutter.

The animal feed gel of this invention, either shaped into the form of a natural food product or in the form of a block or slab, are readily frozen for shipment and storage. The gel is available to the animal as a food source upon thawing, and it has the texture and consistency of a set, tough gelatin.

BRIEF DESCRIPTION OF THE DRAWINGS

FIG. 3A is a top view of a cutter with an elongated diamond pattern for a small fish.

FIG. 3B is a side view of a cutter with an elongated diamond pattern for a small fish.

FIG. 4A is a top view of a cutter with an elongated diamond pattern for a large fish.

FIG. 4B is a side view of a cutter with an elongated diamond pattern for a large fish.

DETAILED DESCRIPTION OF THE INVENTION

Figure 1:
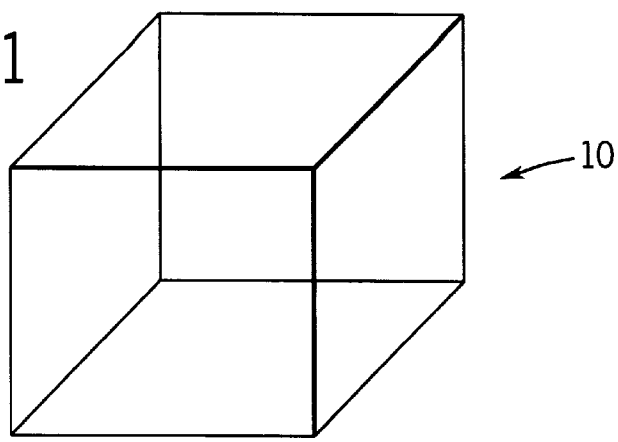
FIG. 1 is an illustration of one embodiment of a set animal feed gel block.

The animal feed gel of this invention is intended as a replacement for a natural food product. For example, the "artificial fish" of this invention are intended as a replacement for the fresh or frozen fish currently used in feeding programs for various fish-eating animals, e.g. penguins and other seabirds, seals, walruses, otters, polar bears and the like. The gel products of this invention are prepared from water, at least one gelling agent, and at least one source of animal protein. Optionally and preferably, the animal food gels also contain other nutritionally valuable ingredients such as oils and/or fats, plant protein, vitamins, minerals, and the like.

Any edible material (i.e. any material that can be consumed by the target animal without detriment to its health) that will assist in the formation of a colloid in which the disperse phase (e.g. the animal protein) combines with the continuous phase (e.g. water) to produce a firm, flexible product (e.g. a product with the consistency similar to that of a hot dog) can be used as the gelling agent in the practice of this invention. The typical and preferred gelling agents are gelatin and the gums, and these can be used alone or in combination with one another (e.g. one gelatin, one gum, two or more gelatins, two or more gums, one or more gelatins in combination with one or more gums, etc.). In one preferred embodiment, the gelling agent comprises one gelatin in combination with one or more gums.

The amount of gelling agent in the final food product gel is typically at least about 0.2, preferably at least about 2 and more preferably at least about 4, weight percent based. on the total weight of the gel. The maximum amount of gelling agent can vary to convenience, but typically it does not exceed about 12, preferably it does not exceed about 8 and more preferably it does not exceed about 6, weight percent of the total weight of the gel.

Generally any source of gelatin can be used as the gelling agent in the practice of this invention. Beyond its nutritional value, its purpose is to provide structural strength to the finished product.

Similarly, any gum can be used as the gelling agent in the practice of this invention. Gum is of minimal nutritional value but it too lends to the structural integrity of the final product. Moreover, gums provide an assist to the setting process, e.g. they impede the separation of feed ingredients during the setting process. Typical gums include arabic, kauri, tragacanth and xanthan. The gums can be used alone or in combination with one another. If used in combination with a gelatin, then the amount of gum in the final product is typically at least about 0.05, preferably at least about 0.1 and more preferably at least about 0.25, weight percent based on weight of the product. The maximum amount of gum in the final product can vary to convenience in this circumstance, but typically it does not exceed about 2, preferably it does not exceed about 1 and more preferably it does not exceed about 0.5, weight percent.

The animal protein used in the practice of this invention can originate from one or multiple sources. Typical sources of animal protein include animal byproduct meals such as the meals of meat, poultry, blood, feather and fish. These sources are well known and commercially available and depending upon the nutritional balance desired, two or more are often used in combination. When the shaped food gel is an artificial fish, the preferred animal protein source is fish meal.

The amount of animal protein used in the practice of this invention is typically at least about 6, preferably at least about 12 and more preferably at least about 18, weight percent based on the total weight of the food product. The maximum amount of animal protein present in the food product typically does not exceed about 30, preferably it does not exceed about 25 and more preferably it does not exceed about 20, weight percent.

Optionally and preferably, the gel product of this invention comprises at least one oil or fat. The oils and fats of this invention include liquid and soluble materials comprising edible mono-, di- and triglycerides of fatty acids and free fatty acids which are not inherently present in any other nonfat sources that may be present in the final food product, e.g. the indigenous fat present in fish meal. The oil and fats include both animal fat, e.g. beef tallow, bleachable fancy tallow, choice white grease, yellow grease, and the like; vegetable oil, e.g. soybean oil, palm oil, cottonseed oil, sunflower oil, corn oil, canola oil and the like; fish oil, and combinations of any of these. In the embodiment in which the shaped gel product is an artificial fish, preferably an oil or fat is present and preferably it is fish oil.

The amount of oil or fat in the food product is dependent, at least in part, on whether or not the animal feed formulation is designed for either low or high fat content. If designed for a low fat content, then typically the amount of oil or fat in the feed is at least about 0.25, preferably at least about 0.5 and more preferably at least about 1, weight percent based on the weight of the shaped animal feed. In these low fat formulations, the maximum amount of oil or fat in the animal feed typically does not exceed about 2.5, preferably does not exceed about 2 and more preferably does not exceed about 1.5, weight percent. If designed for a high fat content, then typically the amount of oil or fat in the feed is at least about 2.5, preferably at least about 3 and more preferably at least about 4, weight percent based on the weight of the animal feed. In these high fat formulations, the maximum amount of oil or fat in the animal feed typically does not exceed about 10, preferably does not exceed about 8 and more preferably does not exceed about 6, weight percent.

Again, depending upon the desired nutritional value of the final gel product, typically and preferably the final gel product contains various other nutritional values such as plant protein (e.g. soybean meal, canola meal, cotton seed meal, sunflower meal, etc.), starch (e.g. corn and wheat flour, barley, oats, sorghum, tapioca, their milled components, etc.), vitamins (e.g. vitamins A, the various B vitamins, C, D, E, etc.), minerals (e.g. potassium chloride, salt, zinc oxide, etc.), amino acids (e.g. dl methionine, thiamin px, 1 tryptophan, etc.) and the like. These optional ingredients are generally present in minor amounts relative to the animal protein.

Water comprises the balance and majority of the food product. For animals that drink water, e.g. polar bears, big cats, etc., the moisture content can vary widely and is of little nutritional importance. For animals whose main source of water is the feed gel, e.g. penguins, parrot chicks, etc., the moisture content is nutritionally important, and it typically is at least about 70, preferably at least about 73 and more preferably at least about 75, % of the total weight of the animal feed gel.

The typical preparation of the gel begins with the addition of the gelling agent to water, and then heating the water to a temperature and for a time sufficient to dissolve the gelling agent, e.g. to a temperature of at least about 120, preferably at least about 150 and more preferably at least about 180, F for at least about 0.5, preferably at least about 1 and more preferably at least about 3, minutes. Once the gelling agent is dissolved, then the remainder of the ingredients are added, generally as a previously prepared mix, and stirred to form a homogeneous mass. The resulting mass (i.e. mixture) is then poured into molds or cast into a block and allowed to cool to form a finished product with sufficient structural integrity that it can be handled in a routine manner without breakage, e.g. if molded or cut into the general shape of a fish, then hand-fed to a carnivore without breaking in the hand of the feeder. The rate of cooling and the amount of time necessary to allow the product to gel sufficiently for handling purposes will vary with the composition of the product, but generally the product is cooled to below room temperature, i.e. to a refrigeration or freezing temperature.

Figure 2:
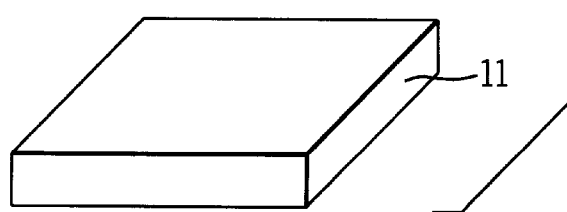
FIG. 2 is an illustration of the block of FIG. 1 marked for cutting into slabs, and a cut slab.

In one embodiment of this invention, the liquid mixture is poured into a mold for a block (see block 10 in FIG. 1), and the mixture is allowed to set. The block is then removed from the mold and frozen or in certain embodiments, frozen in the mold (e.g. a cardboard shipping box). When needed, the block is thawed, optionally cut into slabs (see FIG. 2 for block 10 marked for cutting into slabs and slab 11), and then cut to a desired shaped (FIG. 3A illustrating a cutter for an elongated diamond shape to approximate the shape of a small fish, e.g. a herring, and FIG. 4A illustrating a cutter for an elongated diamond approximating the shape of a larger fish, e.g. a mackerel). Alternatively, the block and/or slab can be cut while still frozen. The block is typically sized in one dimension such that when the gel is cut with the patterned cutter such as that illustrated in FIG. 3A and 4A, a "fish" of desired size (e.g. 3, 6, 9 or 12 inches in length) is produced. This particular method of food product preparation is particularly well adapted for providing large consumers of such products, e.g. zoos, amusement parks with entertainment animals, etc., with a readily available source of product which can be easily stored for long periods of time yet prepared quickly and efficiently.

With respect to FIGS. 3A–B and 4A–B, each illustrates a cutter comprising a frame attached in any suitable manner, e.g. mechanical fasteners, adhesive, etc., to a patterned blade arrangement 13. Frame 12 can be designed for hand or machine operation, or both, and it can be made of any suitable material, e.g. wood, metal, plastic, etc. Blade arrangement 13 can have any desirable pattern (here illustrated in the pattern of small and large elongated diamonds to resemble generally the shape of a fish), and these too can be made of any material that will efficiently cut the block (typically an unfrozen block), e.g. metal, plastic, ceramic, etc. In one embodiment, the blade arrangement comprises a pattern of wires.

The following examples are illustrative of certain specific embodiments of this invention. Unless indicated to the contrary, all parts and percentages are by weight.

SPECIFIC EMBODIMENTS

Preparation of High Fat Artificial Fish

Gelatin 300 bloom (1.200 lb, 4%), gelan gum (0.075 lb, 0.25%), xanthan gum (0.045 lb, 0.15%), and tetrasodium pyrophosphate (0.015 lb, 0.15%) were dispersed in cold tap water (22.5 lb, 75%) in a Groen 20 liter steam kettle, and then heated to 180 F to solubilize the gums. After one minute at 180 F, the dry premix (6.165 lb, 20.550%) of the Table was added to the kettle and the resulting mixture blended to form a homogeneous mass and then poured into molds made from real fish. The resulting product (artificial fish) was cooled, removed from the molds, frozen and packaged for shipment to a test facility.

TABLE

Dry Premix Formulation

| Ingredient | Pounds | Percent |
| --- | --- | --- |
| Blood Meal | 5.962 | 3.9748 |
| Fish Meal | 52.809 | 35.2063 |
| Poultry Meat Meal | 32.835 | 21.8899 |
| Fish Oil | 31.835 | 21.3287 |
| Salt | 0.181 | 0.1209 |
| Micro Premix* | 6.904 | 4.6024 |
| Total Meal | 130.685 | 87.1230 |

*Mixture of various vitamins, minerals and other nutritional materials.

Test Protocol

Five King penguins from the 1995/96 breeding season were used as the test subjects. The birds were 66 days of age at the start of the program. Adult birds were expected to consume 424 grams per day of feed, while chicks were expected to consume 1,000 grams per day.

The artificial fish (i.e. the shaped animal feed) used in the test program were those prepared as described above. They were packaged in five pound bags which were contained in an insulated box and kept frozen. The fish were removed from the box 24 to 36 hours before use, and allowed to thaw in a refrigerator. The fish were easily separated from one another after 24 hours.

At the beginning of the program, the birds assigned to the artificial fish diet started a slow transition from a mixed fish diet. This mixed fish diet served as a control, and consisted of 70% capelin and 30% herring. The birds of both test groups were hand-fed, their body weights determined daily, and their blood sampled at the beginning of the program and every subsequent 30 days.

Results

The birds fed the artificial fish diet grew similarly to those fed the fish diet of the control group. The body weight differences between the birds of the test and control groups were not statistically significant, and the maximum weight of the birds on the artificial fish diet was achieved at an earlier date than those on the control fish diet.

The differences between the two treatments in feed consumption per day, gain per day and feed to gain were not statistically significant. Likewise, the plasma fat soluble vitamin levels were similar as were the serum mineral levels. Similar levels were also observed in both groups of birds for plasma amino acids.

Although only a few embodiments of the present invention are described above in. detail, those skilled in the art will appreciate that many additions and modifications can be made without departing from the spirit and scope of the invention. These and all other modifications are included within the scope of the present invention as described in the following claims.

What is claimed is:

1. A nutritionally balanced, firm, flexible feed gel for animals, the gel comprising in weight percent based upon the weight of the gel:
   A. Between about 1 and about 12% of a gelling agent comprising at least one gelatin and at least one gum;
   B. Between about 6 and about 30% of at least one animal protein; and
   C. Water.

2. The gel of claim 1 in which the animal protein is at least one of meat, poultry, blood, feather and fish meal.

3. The gel of claim 2 further comprising at least one oil or fat other than that which may be inherently present in another ingredient of the gel.

4. The gel of claim 3 in which the oil or fat comprises between about 1 and about 10 weight percent of the weight of the gel.

5. The gel of claim 4 further comprising at least one of plant protein, starch, vitamins and minerals.

6. The gel of claim 5 in which water comprises at least about 75 weight percent of the gel.

7. A fish-shaped, nutritionally balanced gel for carnivores, the gel comprising in weight percent based upon the weight of the gel:
   A. Between about 1 and about 12% of at least one gelling agent;
   B. Between about 8 and about 12% fish meal;
   C. Between about 6 and about 8% poultry meal;
   D. Between about 1 and about 1.5% fish oil; and
   E. Water.

8. A fish-shaped, nutritionally balanced gel for carnivores, the gel comprising in weight percent based upon the weight of the gel:
   A. Between about 1 and about 12% of at least one gelling agent;
   B. Between about 6.7 and about 10.1% fish meal;
   C. Between about 4.4 and about 5.8% poultry meal;
   D. Between about 4 and about 6% fish oil; and
   E. Water.

9. A method of preparing a nutritionally balanced, firm, flexible feed gel for animals, the gel comprising in weight percent based upon the weight of the gel:
   A. Between about 1 and about 12% of a gelling agent comprising at least one gelatin and at least one gum;
   B. Between about 6 and about 30% of at least one animal protein; and
   C. Water;

the method comprising the steps of:
   a. Dissolving the gelling agent in the water;
   b. Adding the animal protein to the mixture of dissolved gelling agent and water;
   c. Blending the animal protein and mixture to form a homogeneous mass;
   d. Pouring the mass into a mold; and
   e. Cooling the mass in the mold until the mass forms a firm, flexible gel.

10. The method of claim 9 in which mold is in the shape of a fish.

11. The method of claim 9 in which the mold is in the shape of an elongated diamond.

12. The method of claim 9 in which the mold is in the shape of a block.

13. The method of claim 12 in which the block is cut into shapes which approximate a fish.

14. The method of claim 13 in which the block is cut with a patterned cutter.

15. The method of claim 12 comprising the further steps of freezing the gel, and then thawing it before cutting the block into fish shapes.

16. The method of claim 9 in which the mold is a shipping box.

* * * * *